United States Patent
Takeyama et al.

(10) Patent No.: US 11,408,742 B2
(45) Date of Patent: Aug. 9, 2022

(54) INFORMATION PROCESSING DEVICE

(71) Applicants: TOYOTA JIDOSHA KABUSHIKI KAISHA, Toyota (JP); AISIN AW CO., LTD., Anjo (JP)

(72) Inventors: Hiroaki Takeyama, Nisshin (JP); Xin Jin, Nagoya (JP); Norihiro Nakamura, Toyokawa (JP); Hideki Kasezawa, Okazaki (JP); Kensuke Takeuchi, Okazaki (JP); Hajime Morikawa, Nagoya (JP); Yoko Sakurai, Toyohashi (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/178,077

(22) Filed: Nov. 1, 2018

(65) Prior Publication Data
US 2019/0154456 A1 May 23, 2019

(30) Foreign Application Priority Data
Nov. 20, 2017 (JP) .............................. JP2017-223086

(51) Int. Cl.
*G01C 21/34* (2006.01)
*G01C 21/36* (2006.01)

(52) U.S. Cl.
CPC ..... *G01C 21/3423* (2013.01); *G01C 21/3676* (2013.01)

(58) Field of Classification Search
CPC ........................ G01C 21/3423; G01C 21/3676
See application file for complete search history.

(56) References Cited

U.S. PATENT DOCUMENTS

| | | | |
|---|---|---|---|
| 7,783,400 B1 * | 8/2010 | Zimler | B60S 1/026 219/202 |
| 8,892,361 B2 * | 11/2014 | Kanno | G01C 21/3423 701/483 |
| 10,545,023 B1 * | 1/2020 | Herbach | G08G 1/096833 |
| 2012/0310520 A1 * | 12/2012 | Kanno | G01C 21/3423 701/400 |
| 2012/0323485 A1 * | 12/2012 | Mutoh | G01S 19/13 701/428 |
| 2013/0060462 A1 * | 3/2013 | Hansen | G01C 21/3476 701/428 |
| 2015/0142307 A1 * | 5/2015 | Nishino | G01C 21/34 701/465 |
| 2017/0254655 A1 * | 9/2017 | Kato | G06Q 10/047 |
| 2018/0211337 A1 * | 7/2018 | Ghaddar | G06Q 50/14 |

FOREIGN PATENT DOCUMENTS

| | | | |
|---|---|---|---|
| JP | 2005-164464 A | 6/2005 | |
| JP | 5032592 | * 9/2012 | ............. G01C 21/28 |
| JP | 2015087136 A | 5/2015 | |

OTHER PUBLICATIONS

Machine Translation JP 5032592 (published Sep. 2012).*

* cited by examiner

*Primary Examiner* — Babar Sarwar
(74) *Attorney, Agent, or Firm* — Hunton Andrews Kurth LLP

(57) ABSTRACT

In an information processing device, an acquisition unit acquires current position information of a vehicle. A route search unit searches for a route from a departure place via the current position of the vehicle to a destination based on the current position information of the vehicle acquired by the acquisition unit.

6 Claims, 5 Drawing Sheets

INFORMATION PROCESSING DEVICE

INCORPORATION BY REFERENCE

The disclosure of Japanese Patent Application No. 2017-223086 filed on Nov. 20, 2017 including the specification, drawings and abstract is incorporated herein by reference in its entirety.

BACKGROUND

1. Technical Field

The disclosure relates to an information processing device that notifies a user of information.

2. Description of Related Art

A route search device that searches for an outward route from a departure place to a destination and a return route from the destination to home by combining each movement means with walking, a vehicle, and public transportation as the movement means is known (for example, refer to Japanese Unexamined Patent Application Publication No. 2005-164464 (JP 2005-164464 A)). The route search device searches for the outward route where a user moves by the vehicle from the departure place to a parking lot near a transit point and by another transportation means from the parking lot to the destination, and the return route where the user moves by another transportation means from the destination to the parking lot near the transit point and by the vehicle from the parking lot to the home.

SUMMARY

In the related art, since a route where the user moves by the transportation means other than the vehicle from a predetermined departure place to a parking lot where the vehicle is parked and gets in the vehicle to move to the destination is not assumed to be searched for, there may be an inconvenient case depending on a situation.

The disclosure provides an information processing device capable of improving convenience when a route from a departure place to a destination is searched for.

An aspect of the disclosure relates to an information processing device including an acquisition unit and a route search unit. The acquisition unit is configured to acquire current position information of a vehicle. The route search unit is configured to search for a route from a departure place via the current position of the vehicle to a destination based on the current position information of the vehicle acquired by the acquisition unit.

According to the aspect of the disclosure, since the route from the departure place via the current position of the vehicle to the destination is searched for based on the current position information of the vehicle acquired by the acquisition unit, it is possible for the user to save time and labor for setting the current position of the vehicle as a via point and thus it is possible to improve convenience when the route from the departure place to the destination is searched for.

In the information processing device according to the aspect of the disclosure, the route search unit may further search for a route extending from the departure place to the destination without passing through the current position of the vehicle. The information processing device may further include an output unit configured to output a plurality of searched routes.

In the information processing device according to the aspect of the disclosure, the route search unit may search for a route again when the current position of the vehicle is changed.

According to the aspects of the disclosure, it is possible to improve convenience when the route from the departure place to the destination is searched for.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
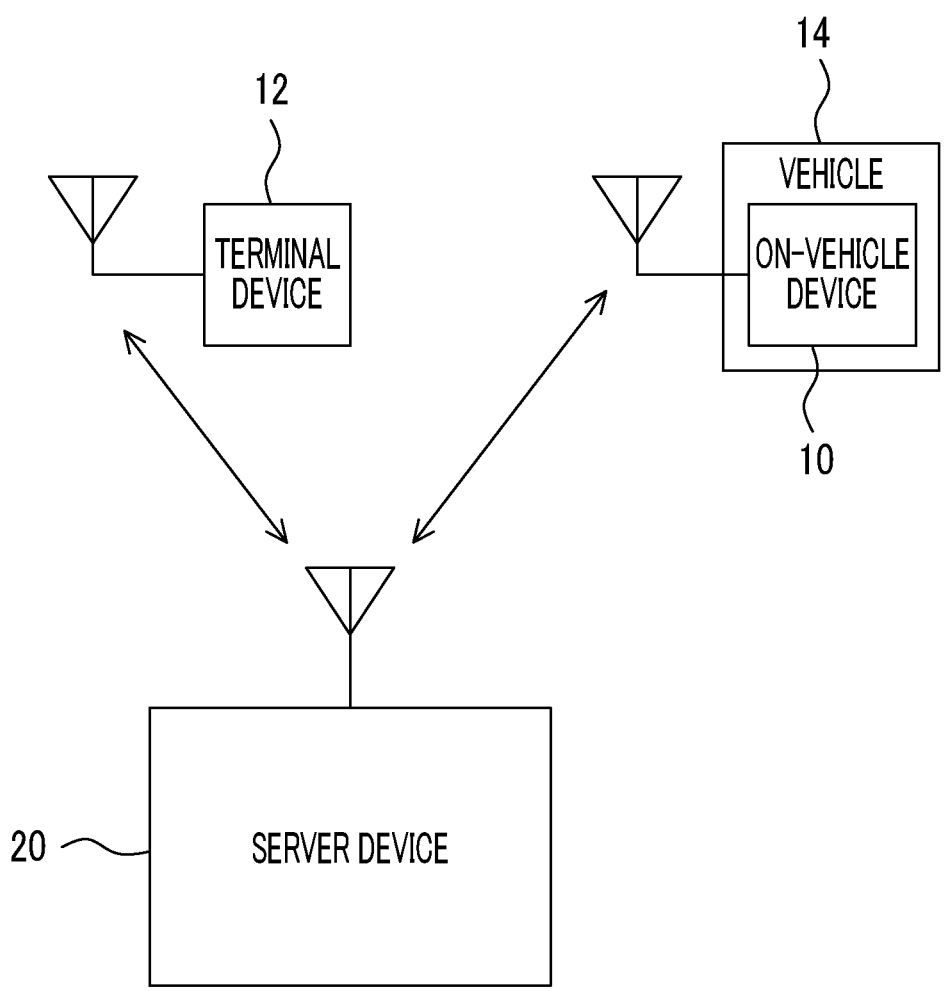
FIG. 1 is a block diagram showing a configuration of a vehicle system according to a first embodiment.

FIG. 1 is a block diagram showing a configuration of a vehicle system 1 according to a first embodiment. The vehicle system 1 includes an on-vehicle device 10, a terminal device 12, and a server device 20. Here, an example will be described in which one on-vehicle device 10 and one terminal device 12 that are used by the same user are provided for an easily understandable description. However, the vehicle system 1 may include a plurality of on-vehicle devices 10 and a plurality of terminal devices 12.

The on-vehicle device 10 is a car navigation device and the like mounted on a vehicle 14 that is an automobile. The on-vehicle device 10 performs wireless communication with the server device 20. The terminal device 12 is a portable apparatus carried by a user who is a driver of the vehicle 14, such as a smartphone, a mobile phone, a tablet terminal, a notebook personal computer, or a wearable terminal. The terminal device 12 performs the wireless communication with the server device 20.

A standard of the wireless communication is not particularly limited, but includes, for example, a third generation mobile communication system (3G), a fourth generation mobile communication system (4G), or a fifth generation mobile communication system (5G). Each of the on-vehicle device 10 and the terminal device 12 may perform the wireless communication with the server device 20 through a base station (not shown).

The on-vehicle device 10 periodically acquires current position information of a host vehicle and transmits the current position information to the server device 20. The current position information is acquired from, for example, a global positioning system (GPS) receiver (not shown) provided in the vehicle 14. Information for identifying the vehicle 14 that is a transmission source is attached to the current position information.

The terminal device 12 periodically acquires the current position information of the terminal device 12 and transmits the current position information to the server device 20. The current position information is acquired from, for example, a GPS receiver (not shown) provided in the terminal device 12. Information for identifying the terminal device 12 that is the transmission source is attached to the current position information. Here, the on-vehicle device 10 and the terminal device 12 are used by the same user. Thus, the information for identifying the terminal device 12 is associated with the information for identifying the vehicle 14 in advance.

Each of the on-vehicle device 10 and the terminal device 12 can receive an input of route search information for performing a route search by the user. Examples of the route search information are a departure place, a destination, and whether to use the vehicle. When the user gets in the vehicle 14, the user may input to the on-vehicle device 10 or the terminal device 12. When the user gets off the vehicle 14, the user may input to the terminal device 12. A current position of the vehicle 14 or a current position of the terminal device 12 may also be designated as the departure place. Each of the on-vehicle device 10 and the terminal device 12 transmits the input route search information to the server device 20.

The server device 20 is installed, for example, in a data center and functions as an information processing device configured to process the information transmitted from the on-vehicle device 10 and the terminal device 12 to execute the route search.

Figure 2:
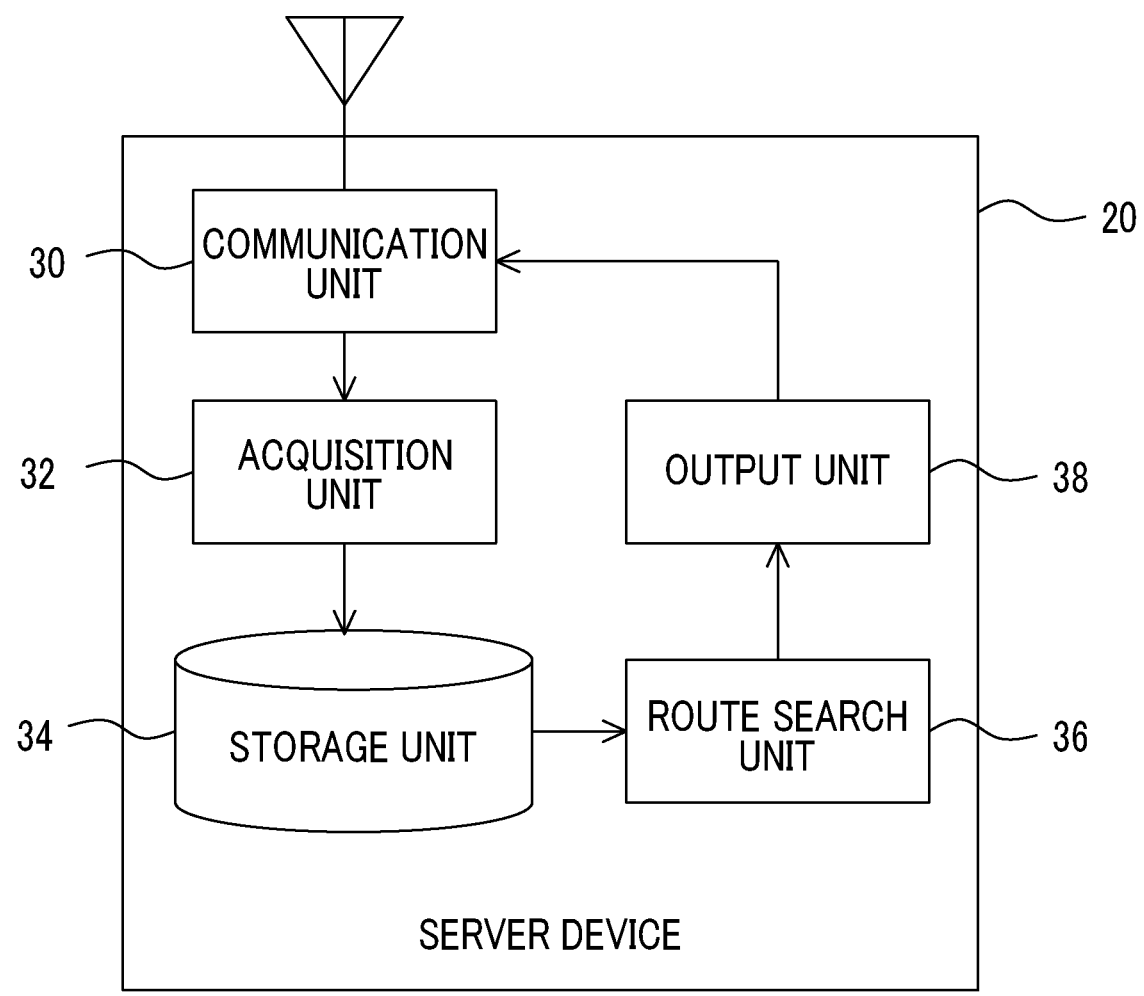
FIG. 2 is a block diagram showing a configuration of a server device in FIG. 1.

FIG. 2 is a block diagram showing a configuration of the server device 20 in FIG. 1. The server device 20 includes a communication unit 30, an acquisition unit 32, a storage unit 34, a route search unit 36, and an output unit 38.

The communication unit 30 performs the wireless communication with the on-vehicle device 10 and the terminal device 12. The communication unit 30 receives the current position information and the route search information from each of the on-vehicle device 10 and the terminal device 12. The communication unit 30 outputs the current position information of the vehicle 14, the current position information of the terminal device 12, and the route search information to the acquisition unit 32.

The acquisition unit 32 acquires pieces of current position information of the vehicle 14 and the terminal device 12, and the route search information that are received by the communication unit 30. The acquisition unit 32 outputs the pieces of current position information and the route search information to the storage unit 34. The storage unit 34 stores the pieces of current position information and the route search information that are acquired by the acquisition unit 32. The pieces of current position information stored in the storage unit 34 are sequentially updated, and the latest pieces of current position information are maintained. When the on-vehicle device 10 stops the transmission of the current position information due to turn-off of an accessory switch of the vehicle 14, or when the communication unit 30 cannot receive the current position information due to an entry of the vehicle 14 into an underground parking lot, the pieces of current position information received at the last by the communication unit 30 are maintained. The storage unit 34 stores map data in advance. The map data includes information relating to public transportation such as a train or a bus and information relating to a parking lot. The information relating to the public transportation includes information relating to a timetable and a fee for the public transportation, and the information relating to the parking lot includes information relating to a parking lot fee.

When the vehicle is not used in the route search information, the route search unit 36 searches for at least one route, independently of the current position of the vehicle 14, extending from the departure place to the destination without passing through the current position of the vehicle 14 based on the route search information stored in the storage unit 34 and the map data. The route search unit 36 searches for a route where the user moves by the public transportation or the walking without using the vehicle 14. Since a known technique can be used for the route search, a further description thereof is omitted.

When the vehicle is used in the route search information, the route search unit 36 searches for at least one route from the departure place via the current position of the vehicle 14 to the destination based on the current position information of the vehicle 14, the route search information, and the map data that are stored in the storage unit 34. The route search unit 36 searches for the route where the user moves by the public transportation or the walking from the departure place to the current position of the vehicle 14 and searches for a route where the user moves by the vehicle 14 from the current position of the vehicle 14 to the destination. The route search unit 36 derives a time and a fee for the public transportation requested for moving on the searched route based on the map data. The acquisition unit 32 may receive traffic information (congestion information, regulation information, suspension or delay information, or the like) through the Internet (not shown) or the like, and the route search unit 36 may derive the time requested for moving on the searched route using the traffic information.

When a route via a station, a bus stop, or the like within a predetermined distance to the current position of the vehicle 14 cannot be found, the route search unit 36 stops the search of the route via the current position of the vehicle 14. The predetermined distance is a distance at which the user feels inconvenience in a movement by the walking, for example, several kilometers. The predetermined distance may be designated by a user operation of the on-vehicle device 10 or the terminal device 12.

When the vehicle is used in the route search information, the route search unit 36 may further search at least one route extending from the departure place to the destination without passing through the current position of the vehicle 14. In the case, the route search unit 36 derives the time and the fee for the public transportation requested for moving on the searched route and a parking fee of a parking lot where the vehicle 14 is parked based on the map data and the current position of the vehicle 14. The parking fee is a fee for a predetermined period such as one day or the like and is a rough amount of the parking fee when the user moves to the destination while the vehicle 14 is parked using the route without passing through the current position of the vehicle 14.

Figure 3:
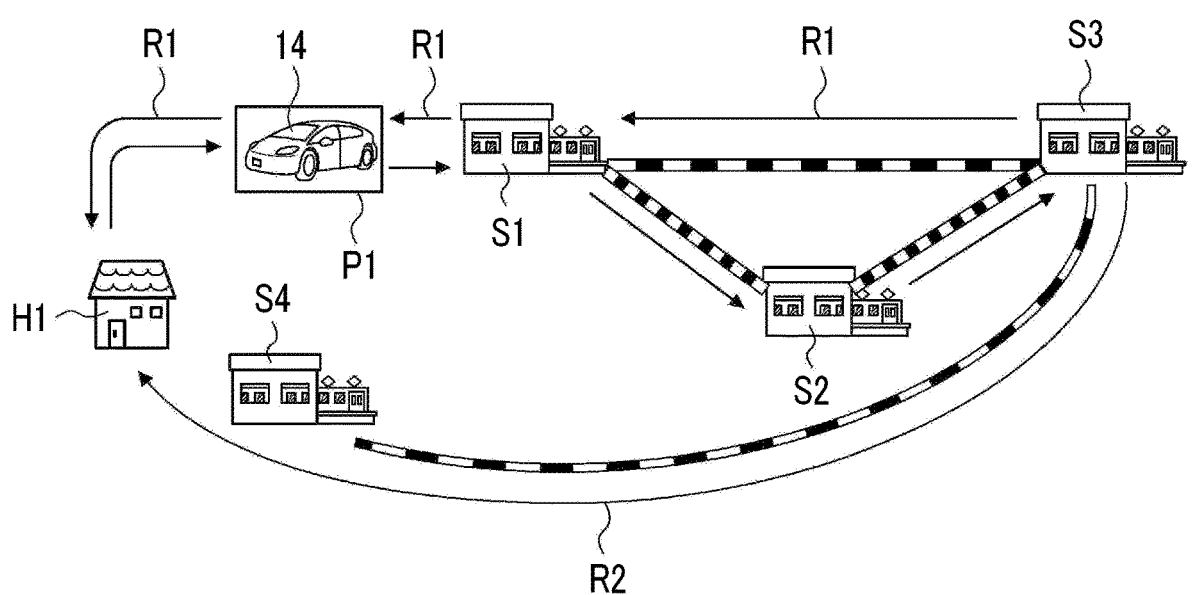
FIG. 3 is a diagram for describing an example of a route searched for by the server device in FIG. 1.

An example of the route search will be described with reference to FIG. 3. FIG. 3 is a diagram for describing an example of a route searched for by the server device 20 in FIG. 1. In FIG. 3, the following situation is assumed. The user moves from a home H1 to a parking lot P1 near a station S1 by the vehicle 14, moves from the parking lot P1 to the station S1 by the walking, and moves from the station S1 to a station S2 by the train to arrive at a first destination near the station S2. Next, the user departures the first destination and moves from the station S2 to a station S3 by the train to arrive at a second destination near the station S3. When the user returns to the home, the route search to the home H1 is performed using the terminal device 12 at the second destination. At the time, the user inputs the current position as the departure place, inputs the home H1 as the destination, and inputs information indicating that the vehicle is used, to the terminal device 12.

The route search unit 36 searches for a route R1 from the departure place via the current position of the vehicle 14 to the destination. The route R1 is a route where the user moves from the nearest station S3 to the second destination that is the departure place to the nearest station S1 to the current position of the vehicle 14 by the train, moves from the station S1 to the parking lot P1 that is the current position of the vehicle 14 by the walking, and moves from the parking lot P1 to the home H1 by the vehicle 14. The shortest route without passing through the station S2 is searched for from the station S3 to the station S1.

The route search unit 36 further searches for a route R2 extending from the departure place to the destination without passing through the current position of the vehicle 14. The route R2 is a route where the user moves from the station S3 to the nearest station S4 to the home H1 by the train and moves from the station S4 to the home H1 by the walking. For example, the route R2 has a shorter movement distance and movement time than the route R1.

Returning to FIG. 2. The route search unit 36 supplies pieces of information relating to the searched route, the time and the fee for the public transportation requested for moving on the searched route, a parking fee of the parking lot P1 where the vehicle 14 is parked to the output unit 38. The output unit 38 outputs the supplied pieces of information to the on-vehicle device 10 and the terminal device 12 through the communication unit 30. The communication unit 30 transmits the pieces of information output from the output unit 38 to the on-vehicle device 10 and the terminal device 12.

Each of the on-vehicle device 10 and the terminal device 12 receives the pieces of information transmitted from the communication unit 30, and displays a plurality of routes and requested times and fees for the routes based on the received information. However, in a situation in FIG. 3, since the vehicle 14 is parked and a power source of the on-vehicle device 10 is in an off state, the on-vehicle device 10 does not receive and display the pieces of information. The user can select a desired route from the displayed routes. Each of the on-vehicle device 10 and the terminal device 12 may perform route guidance according to the selected route. In the situation in FIG. 3, the user can also select the route R2 when the user desires to return to the home as soon as possible. The user can also select the route R1 when a parking fee requested for the case of the route R2 is high, when picking up of the vehicle 14 at a later date takes time and labor, or the like.

There is a possibility that another user who shares the vehicle 14 with the user drives and moves the vehicle 14 while the user heads toward the vehicle 14 parked in the parking lot P1. Such the other user is assumed to, for example, be a family member of the user or the like. When the current position of the vehicle 14 is changed while the user heads toward the vehicle 14 after the route via the current position of the vehicle 14 is searched for, the route search unit 36 again searches for a route from the current position of the terminal device 12 to the destination without passing through the current position of the vehicle 14. It is possible to specify that the user heads toward the vehicle 14 from the current position of the terminal device 12 and the searched route. The terminal device 12 displays the newly searched route. The user who recognizes that the current position of the vehicle 14 is changed due to the display of the newly searched route can stop the use of the vehicle 14.

Alternatively, the user who recognizes that the current position of the vehicle 14 is changed may contact the driver who drives the vehicle 14 by telephone or the like to perform waiting. In the case, the user inputs a waiting place to the terminal device 12. The waiting place may be the current position of the vehicle 14. The terminal device 12 transmits the waiting place to the server device 20. In response to a predetermined operation of the terminal device 12 by the user, the route search unit 36 again searches for a route from the current position of the terminal device 12 via the waiting place to the destination. The terminal device 12 displays the newly searched route.

In terms of hardware, the configurations described above can be realized by a CPU, a memory, and other LSIs of any computer. In terms of software, the configurations can be realized by a program loaded in the memory. Here, functional blocks realized by cooperation between the hardware and the software are depicted. Therefore, those skilled in the art understand that the functional blocks can be realized in various forms by the hardware alone, the software alone, or a combination of the above.

Figure 4:
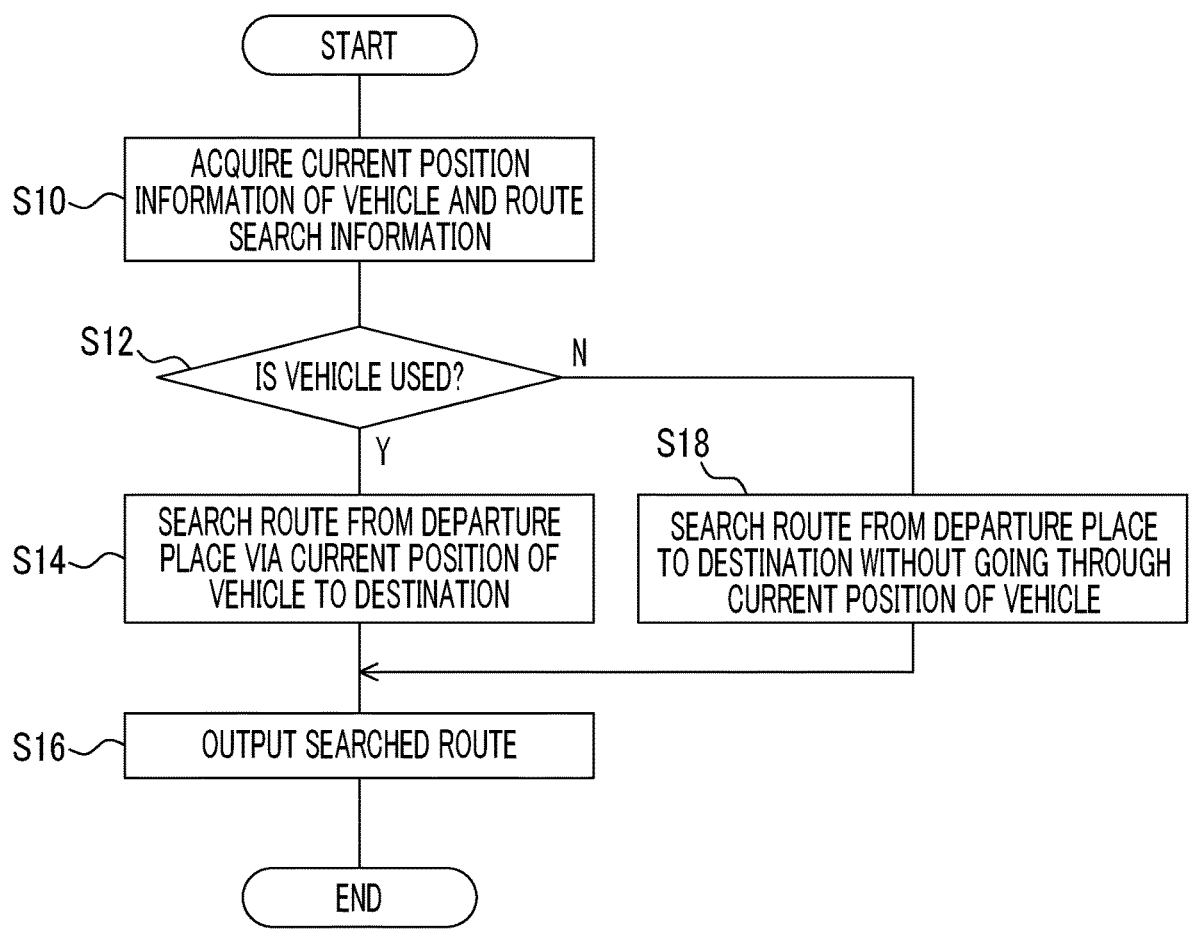
FIG. 4 is a flowchart showing route search processing in the server device in FIG. 1.

Next, the overall operation of the vehicle system 1 with the configurations described above will be described. FIG. 4 is a flowchart showing route search processing in the server device 20 in FIG. 1. The acquisition unit 32 acquires the current position information of the vehicle 14 and the route search information (S10). When the vehicle is used in the route search information (Y in S12), the route search unit 36 searches for the route from the departure place via the current position of the vehicle 14 to the destination based on the current position information of the vehicle 14, the route search information, and the map data (S14). The output unit 38 outputs the searched route to the on-vehicle device 10 and the terminal device 12 (S16). When the vehicle is not used in the route search information (N in S12), the route search unit 36 searches for the route extending from the departure place to the destination without passing through the current position of the vehicle 14 based on the route search information and the map data (S18), and the processing proceeds to step S16.

According to the first embodiment, as described above, since the route from the departure place via the current position of the vehicle 14 to the destination is searched for based on the current position information of the vehicle 14 acquired by the acquisition unit 32, it is possible for the user to save time and labor for setting the current position of the vehicle 14 as a via point and thus it is possible to improve convenience when the route from the departure place to the destination is searched for.

Since the route extending from the departure place to the destination without passing through the current position of the vehicle 14 is searched for, it is possible to present the routes to the user after saving time and labor for the new search. At the time, since the parking fee of the parking lot of the current position of the vehicle 14 is also presented, it is possible to allow the user to select an optimum route according to a situation of the user.

Since the route is searched for again when the current position of the vehicle 14 is changed, it is possible to appropriately deal even when the family member of the user or the like moves the vehicle 14 and thus to improve the convenience. The user who recognizes that the current position of the vehicle 14 is changed can suppress a useless movement.

A second embodiment differs from the first embodiment in that the search of the route is performed by the terminal device 12. Hereinafter, different points from the first embodiment will be mainly described.

The server device 20 receives the current position information from the on-vehicle device 10 and stores the received current position information. The server device 20 stores the map data in advance.

Figure 5:
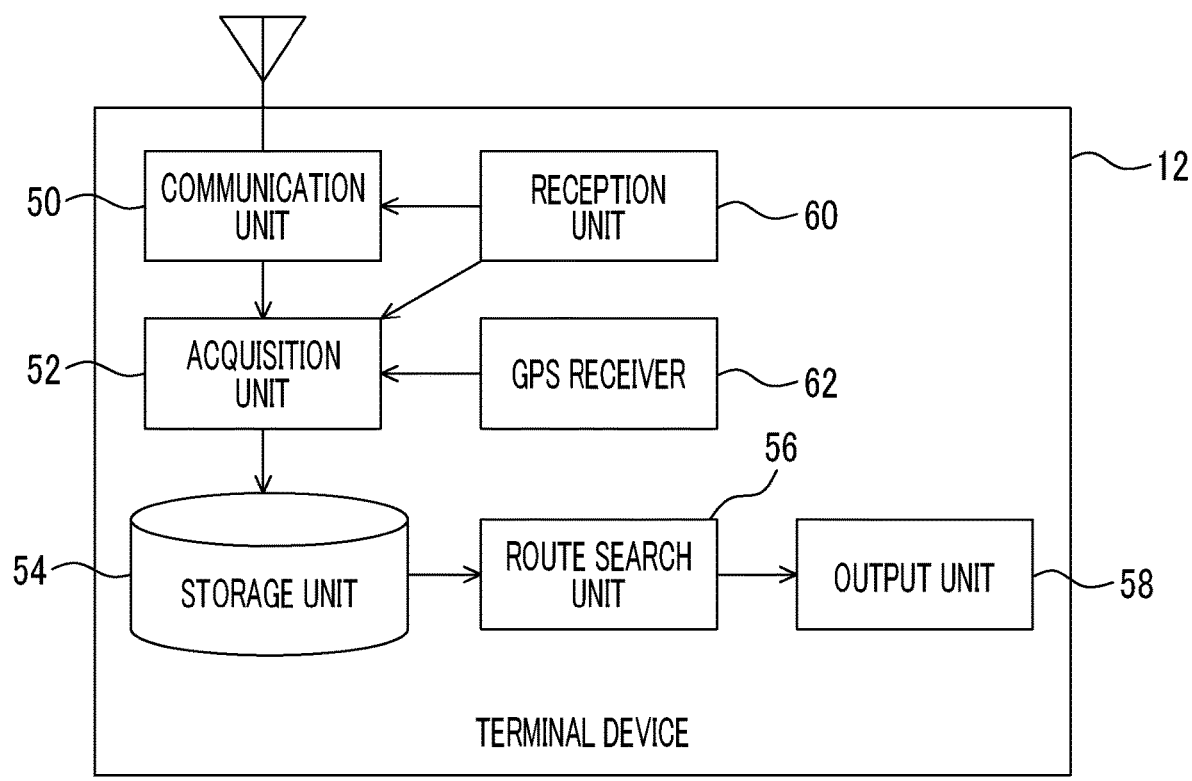
FIG. 5 is a block diagram showing a configuration of a terminal device according to a second embodiment.

FIG. 5 is a block diagram showing a configuration of the terminal device 12 according to the second embodiment. The terminal device 12 functions as the information processing device. The terminal device 12 includes a communication unit 50, an acquisition unit 52, a storage unit 54, a route search unit 56, an output unit 58, an reception unit 60, and a GPS receiver 62.

The reception unit 60 receives an input of the route search information from the user. The reception unit 60 outputs the route search information to the communication unit 50 and the acquisition unit 52. The communication unit 50 performs the wireless communication with the server device 20. When the route search information is output from the reception unit 60, the communication unit 50 transmits a data demand to the server device 20. The server device 20 transmits the current position information of the vehicle 14 and the map data in response to the data demand. The communication unit 50 receives the current position information of the vehicle 14 and the map data from the server device 20. The communication unit 50 outputs the current position information of the vehicle 14 and the map data to the acquisition unit 52. The GPS receiver 62 periodically acquires the current position information of the terminal device 12 and outputs the current position information to the acquisition unit 52.

The acquisition unit 52 acquires the current position information of the vehicle 14 and the map data that are received by the communication unit 50, acquires the route search information received by the reception unit 60, and acquires the current position information of the terminal device 12 acquired by the GPS receiver 62. The acquisition unit 52 outputs the current position information, the map data, and the route search information to the storage unit 54. The storage unit 54 stores the current position information, the map data, and the route search information that are acquired by the acquisition unit 52. The current position information stored in the storage unit 54 is sequentially updated, and the latest current position information is maintained.

The route search unit 56 searches for the same route as in the first embodiment based on the current position information, the route search information, and the map data that are stored in the storage unit 54. The output unit 58 is configured as, for example, a display and outputs the searched route or the like by an image or a character.

According to the second embodiment, a degree of freedom of the configuration of the vehicle system 1 can be enhanced after obtaining the effects of the first embodiment.

The disclosure is described based on the embodiments. The embodiments are merely examples, and those skilled in the art understand that various modifications are possible in a combination of each component and each processing process, and such modifications are within the scope of the disclosure.

For example, a configuration capable of appropriately dealing a situation where a plurality of users shares one vehicle 14 and each user holds the terminal device 12 may be employed. In the case, in the first embodiment, when an instruction of the route search is issued from a terminal device 12 of a user who finally drives the vehicle 14, the route search unit 36 of the server device 20 searches for a route from the departure place via the current position of the vehicle 14 to the destination. When an instruction of the route search is issued from a terminal device 12 of a user other than the user who finally drives the vehicle 14, the route search unit 36 searches for a route extending from the departure place to the destination without passing through the current position of the vehicle 14. The user who finally drives the vehicle 14 may be specified using a known technique. For example, a read device or the like configured to read information of the terminal device 12 is mounted on the vehicle 14, the read information of the terminal device 12 is transmitted from the vehicle 14 to the server device 20, and the transmitted information of the terminal device 12 is stored in the storage unit 34 of the server device 20 as information for identifying the terminal device 12 of the user who finally drives the vehicle 14. The route search unit 36 determines whether the instruction of the route search is issued from the terminal device 12 of the user who finally drives the vehicle 14 with reference to the pieces of information stored in the storage unit 34.

In the second embodiment, the server device 20 also stores the information for identifying the terminal device 12 of the user who finally drives the vehicle 14. When the data demand is issued from the terminal device 12 of the user who finally drives the vehicle 14, the server device 20 transmits information for permitting the search of the route via the current position of the vehicle 14 to the terminal device 12. When the data demand is issued from the terminal device 12 of the user other than the user who finally drives the vehicle 14, the server device 20 transmits information for prohibiting the search of the route via the current position of the vehicle 14 to the terminal device 12. The route search unit 56 of the terminal device 12 searches for the route via the current position of the vehicle 14 solely when the information for permitting the search of the route via the current position of the vehicle 14 is received. In the second embodiment, it is possible to appropriately search for the route for each user even in the situation where the users share the vehicle 14 and each user holds the terminal device 12.

What is claimed is:

1. An information processing device comprising a server device, and the server device is configured to acquire current position information of a vehicle;

store map data, the map data including information relating to public transportation which includes a timetable and a fee for the public transportation and a parking lot fee; and search for routes where a user moves from a departure place passing through the current position of the vehicle to a destination with a time for the moving and a fee requested for the moving based on the acquired current position information of the vehicle and the stored map data, wherein the current position of the vehicle is between the departure place and the destination, and the server device is further configured to:

search for routes extending from the departure place to the destination without passing through the current position of the vehicle; and output a plurality of searched routes that do not pass through the current position of the vehicle.

2. The information processing device according to claim 1, wherein the server device searches for routes again when the current position of the vehicle is changed.

3. A method of processing information, the method comprising:

acquiring current position information of a vehicle;

storing map data, the map data including information relating to public transportation which includes a timetable and a fee for the public transportation and a parking lot fee; and searching for routes where a user moves from a departure place passing through the current position of the vehicle to a destination with a time for the moving and a fee requested for the moving based on the acquired current position information of the vehicle and the stored map data, wherein the current position of the vehicle is between the departure place and the destination, and the method further includes:

searching for routes extending from the departure place to the destination without passing through the current position of the vehicle; and outputting a plurality of searched routes that do not pass through the current position of the vehicle.

4. The method of processing information according to claim 3, wherein the method further comprising:

searching for routes again when the current position of the vehicle is changed.

5. A non-transitory computer-readable recording medium storing a program causing a computer to execute a method for processing information, the method for processing information comprising:

acquiring current position information of a vehicle;

storing map data, the map data including information relating to public transportation which includes a timetable and a fee for the public transportation and a parking lot fee; and searching for routes where a user moves from a departure place passing through the current position of the vehicle to a destination with a time for the moving and a fee requested for the moving based on the acquired current position information of the vehicle and the stored map data, wherein the current position of the vehicle is between the departure place and the destination, and the method further comprising:

searching for routes extending from the departure place to the destination without passing through the current position of the vehicle; and outputting a plurality of searched routes that do not pass through the current position of the vehicle.

6. The non-transitory computer-readable recording medium according to claim 5, wherein the program further comprising:

searching for routes again when the current position of the vehicle is changed.

* * * * *